United States Patent Office 3,311,727
Patented Mar. 28, 1967

3,311,727
GATE VALVE ASSEMBLY FOR ISOLATING FLUID FILLED COMPARTMENTS IN SHIELDED POWER STATION SWITCHING ARRANGEMENT FOR INSPECTION AND/OR REPAIR
Pierre Picard, Argenteuil, France, assignor to S.A. COQ-France, Pantin, Seine, France, a corporation of France
Filed July 18, 1966, Ser. No. 565,867
Claims priority, application France, July 20, 1962, 904,604, Patent 1,347,006
6 Claims. (Cl. 200—148)

This application is a continuation-in-part of my copending application Ser. No. 295,767, filed July 17, 1963.

My present invention relates to a shielded electrical switching assembly of the type used in high-voltage power stations, e.g. those operating at voltages on the order of 200 kv.

Shielded power stations frequently comprise certain control equipment, such as circuit breakers, housed in a metallic container which forms several compartments to accommodate switch contacts for the establishment of a plurality of branch circuits to or from the common circuit breaker or the like. In order to ensure maximum operational safety along with structural compactness, compressed air or some other protective gas of large dielectric constant may surround the conductors and switch contacts within the container.

The several branch switches must be readily accessible for inspection and/or repair. Such access is often required only for the externally connected contacts of a switch which, after the latter is opened, are cut off from the power supply even if the common circuit breaker remains closed and other branch lines continue to function. Particularly under these circumstances it becomes necessary to ensure the safety of the workmen by preventing the possibility of any arc discharge from the live switch contact to the disconnected contact on which work is in progress; at the same time it behooves to minimize the escape of protective gas from the remainder of the container which therefore must be physically isolated from the affected branch before the same is opened.

The general object of my invention is to provide simple and virtually foolproof means for satisfying the aforestated requirements of safety and physical isolation in an installation of the kind set forth.

A more particular object of this invention is to provide means for selectively isolating the several branches from the main body of the container, and from one another, only in the open-circuited condition of the corresponding branch switches while leaving them physically interconnected for free fluid circulation under normal operating conditions whereby no individual refilling of previously opened branch is necessary and the pressure of the protective gas within the container can be centrally controlled and maintained.

The foregoing objects are realized, in accordance with my instant invention, by the provision of a shutter of the gate-valve type in each of the branches, this shutter having a movable element which is interposable between the contacts of an associated branch switch in the withdrawn position of the armature of that switch. The shutter element and the armature thus have intersecting pathways on account of which they cannot be closed concurrently; thus, the closed condition of the shutter, ascertainable from without by visual observation, serves as a positive indication of the fact that the switch is open.

While the system outlined above makes it physically impossible to close both the switch armature and the shutter at the same time, it is also desirable that means should be provided for preventing one of these elements from striking the other by inhibiting the actuation of either the shutter-closing mechanism or the switch-closing mechanism unless the element controlled by the other one of these mechanisms is withdrawn from its closed position. Such interlocking may be accomplished by mechanical and/or electrical means and may replace or supplement the visual ascertainment of the valve position.

The invention will be described in greater detail with reference to the accompanying drawing in which.

Figure 1:
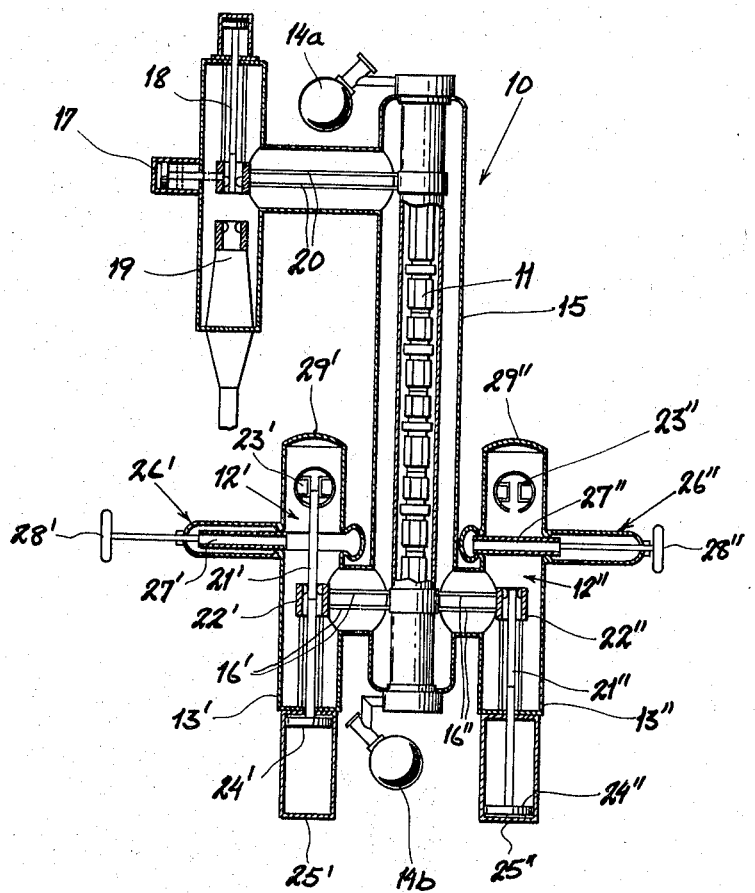
FIG. 1 is a somewhat diagrammatic view, in vertical section, of a shielded power station embodying a switching assembly according to this invention.

In FIG. 1, I have shown a shielded electrical power station comprising, within a sheet-metal container 10, a circuit breaker 11 and two cut-out switches 12', 12" in respective branches 13', 13" of container 10. This container is filled with an insulating fluid under pressure, e.g. compressed air. The fluid is supplied from reservoirs 14a, 14b to a main compartment 15 of the container, occupied by the circuit breaker 11, and enters the branches 13', 13" via respective ducts 16', 16". A pair of switches 17, 18 can be selectively operated for grounding a line 20, leading to circuit breaker 11, or for supplying current thereto from a pair of live terminals 19.

Each of the branch switches 12', 12" has a sliding armature 21', 21" which coacts with two contact pairs 22', 22" and 23', 23", respectively; the armatures 21' and 21" are hydraulically or pneumatically operable with the aid of pistons 24', 24" in cylinders 25', 25". Switch 18 is of similar construction.

Each of the switches 12', 12" has associated with it a respective gate valve 26', 26" whose construction will be described in greater detail with reference to FIG. 2 and which includes a slidable shutter element 27', 27" operated by a hand wheel 28' or 28". As illustrated for branch 13', valve 26' must be open when switch 12' is closed; as shown in connection with branch 13", switch armature 21" must be withdrawn when valve 26" is closed. The position on the left-hand side of the figure (branch 13') represents the normal state of operation whereas the position on the righthand side (branch 13") is established when access must be had to the upper part of the branch, e.g. for inspecting or repairing the contacts 23" which can be reached through a removable lid 29"; a similar lid 29' is, of course, provided for branch 13'.

As clearly seen from FIG. 1, the open or closed condition of gate valves 26', 26" is visually ascertainable from the extent to which the corresponding hand wheel 28' or 28" projects from the valve housing. A workman, noting the fact that hand wheel 28" has been moved fully inwardly, will know that shutter 27" effectively bisects the branch 13" and that switch 12" must be open. It is therefore safe to open the lid 29" since the shutter 27" prevents the workman from accidentally touching the live switch contacts 22" and since the air in the upper part of branch 12" has been effectively isolated from the ionized atmosphere in the remainder of the container; being metallic, the shutter is grounded through the walls of container 10 and contacts 23" are completely surrounded by conductors of zero potential. At the same time, the closed shutter prevents the escape of protective gas under pressure from container compartments 13' and 15 so that the rest of the system can continue to function normally. Naturally, the number of branches 13', 13" equipped with cut-out switches and gate valves may be greater than two.

Figure 2:
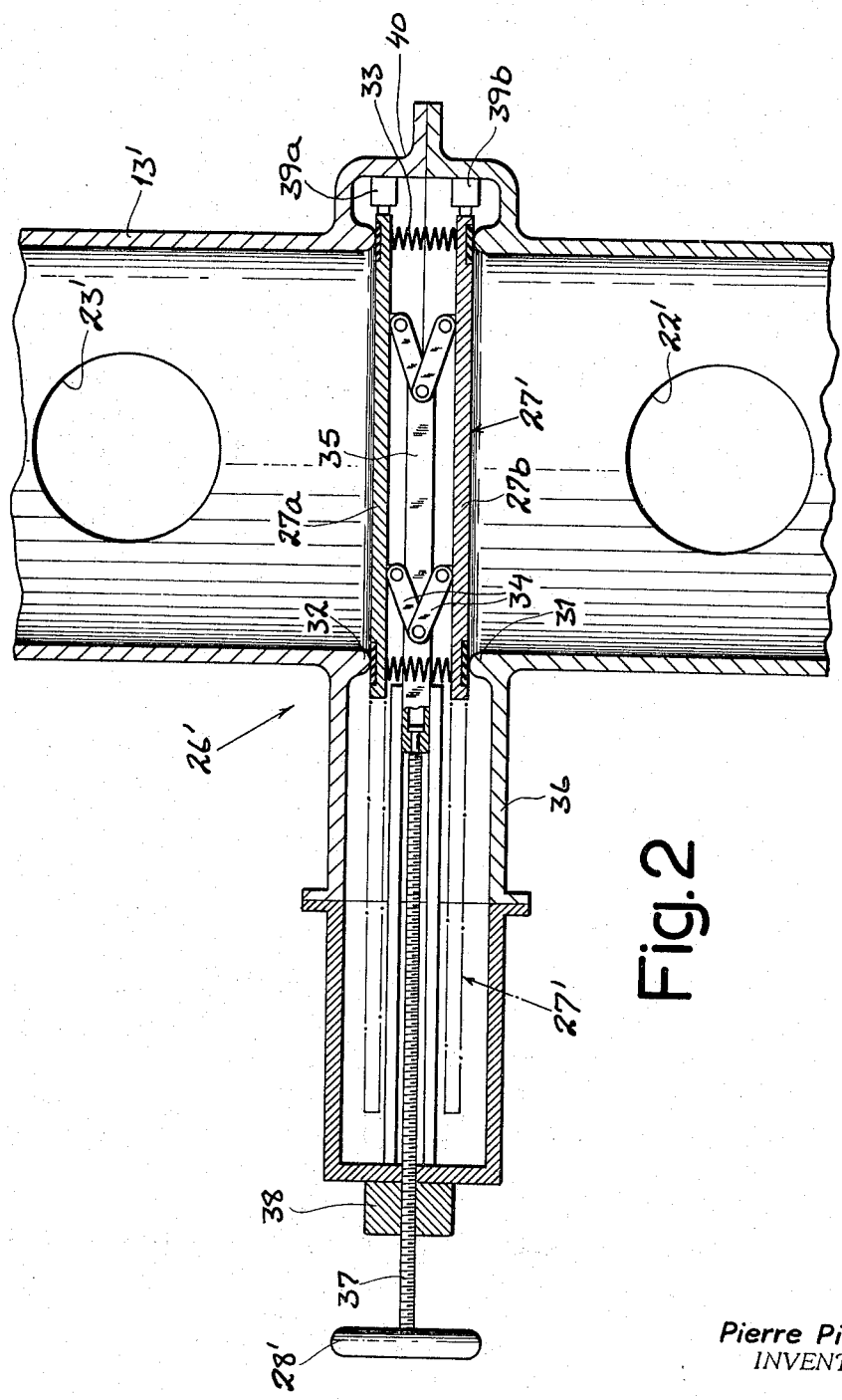
FIG. 2 is an enlarged sectional detail view of a shutter forming part of the switching assembly of FIG. 1.

Reference will now be made to FIG. 2 in which the gate valve 26' has been illustrated on a larger scale and in greater detail. The tubular housing wall constituting the branch 13' has a pair of confronting annular shoulders 31, 32 between which the shutter member 27' is slidable in a direction perpendicular to the tube axis. This shutter member comprises a pair of parallel circular plates 27a, 27b which are urged toward each other by springs 33 and are interconnected by levers 34 pivoted to a central stem 35. A valve housing 36 projects laterally outwardly from tube 13' and accommodates the shutter 27' in a withdrawn position in which the switch armature 21' (not shown in FIG. 2) is free to bridge the contacts 22' and 23'. Stem 35 is engaged by a threaded rod 37 on which the hand wheel 28' is mounted; this rod passes through a nut 38 rigid with valve housing 36 so that rotation of the wheel 28', in one direction or the other, will displace the assembly 35, 27' between the two limiting positions shown in FIG. 2. A pair of abutments 39a, 39b in an extension 40 of valve housing 36 on the opposite side of tube 13' are engaged by the plates 27a, 27b in the inserted position of the shutter whereupon further rotation of hand wheel 28' will exert pressure upon the pivots of levers 34 to drive the plates 27a, 27b apart against the force of springs 33. These plates, therefore, come to rest against the shoulders 31, 32 and form an airtight closure for both the lower and the upper tube sections. Suitable packing means (not shown) should also be provided at the nut 38 to prevent the escape of gas along spindle 37 when the shutter is withdrawn.

Figure 3:
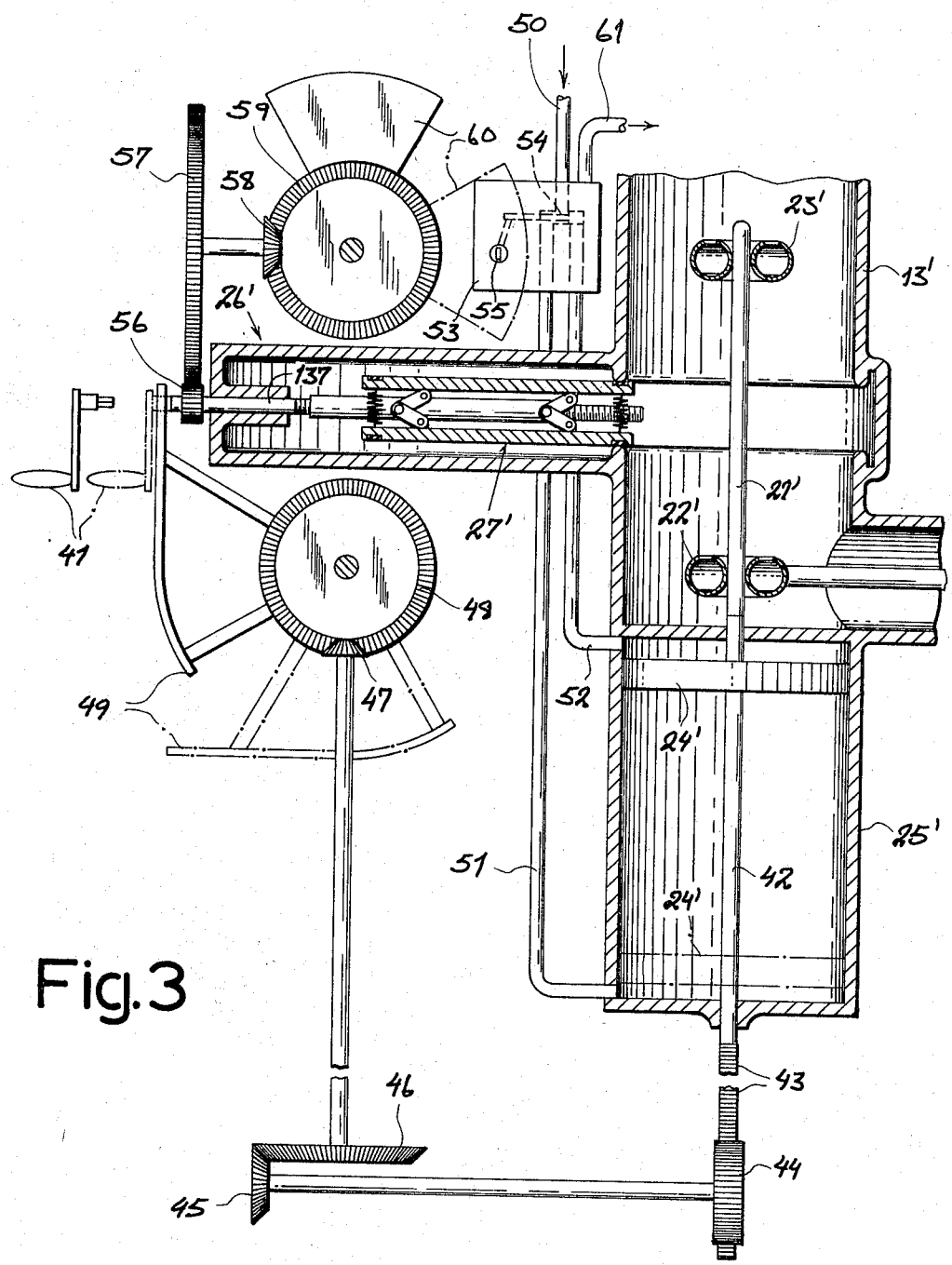
FIG. 3 is a schematic elevational view, partly in section, of an interlocking control system for a gate valve and an associated switch in an assembly similar to that shown in FIG. 1.

In FIG. 3, I have shown a system for interlockingly controlling the actuating piston 24' of switch armature 21' and the shutter 27' of gate valve 26'. In this embodiment, the threaded rod 37 has been replaced by an axially fixed spindle 137 which is rotatable by a hand crank 41 insertable into its exposed end. The rod 42 of piston 24', forming an extension of armature 21', projects downwardly from cylinder 25' and terminates in a rack 43 meshing with a pinion 44. Two pairs of bevel gears 45, 46 and 47, 48 drive a swingable blade 49 which rotates through an angle of about 90° in the course of one piston stroke. Working fluid is admitted to cylinder 25' from an inlet pipe 50 by way of either of two conduits 51, 52 under the control of a valve 53; the valve body 54 is manually operable by means of a key (not shown) which may be the crank 41 alternately used to control the shutter or the switch, this key fitting into a slot 55. A pinion 56 on spindle 137 drives, via a gear 57 and a pair of bevel gears 58, 59 a sectoral plate 60 which swings through an angle of 90° as the shutter 27' is moved from its open position to its closed position or vice versa.

In the specific position illustrated in FIG. 3, in which shutter 27' is withdrawn and armature 21' bridges the contacts 22' and 23', blade 49 overlies the insertion end of spindle 137 so as to prevent introduction of the crank 41 into same. If this crank is now used to reverse the fluid flow from pipe 50 so that piston 24' moves downwardly, with the fluid beneath this piston discharged through an outlet pipe 61, blade 49 will be withdrawn so that the crank 41 may thereafter be inserted into spindle 137, to close the gate valve 26'. When this is done, sector 60 overlies the slot 55 so that the crank again be applied to valve 53, for the purpose of reclosing the armature 21', until shutter 27' has again been withdrawn.

Figure 4:
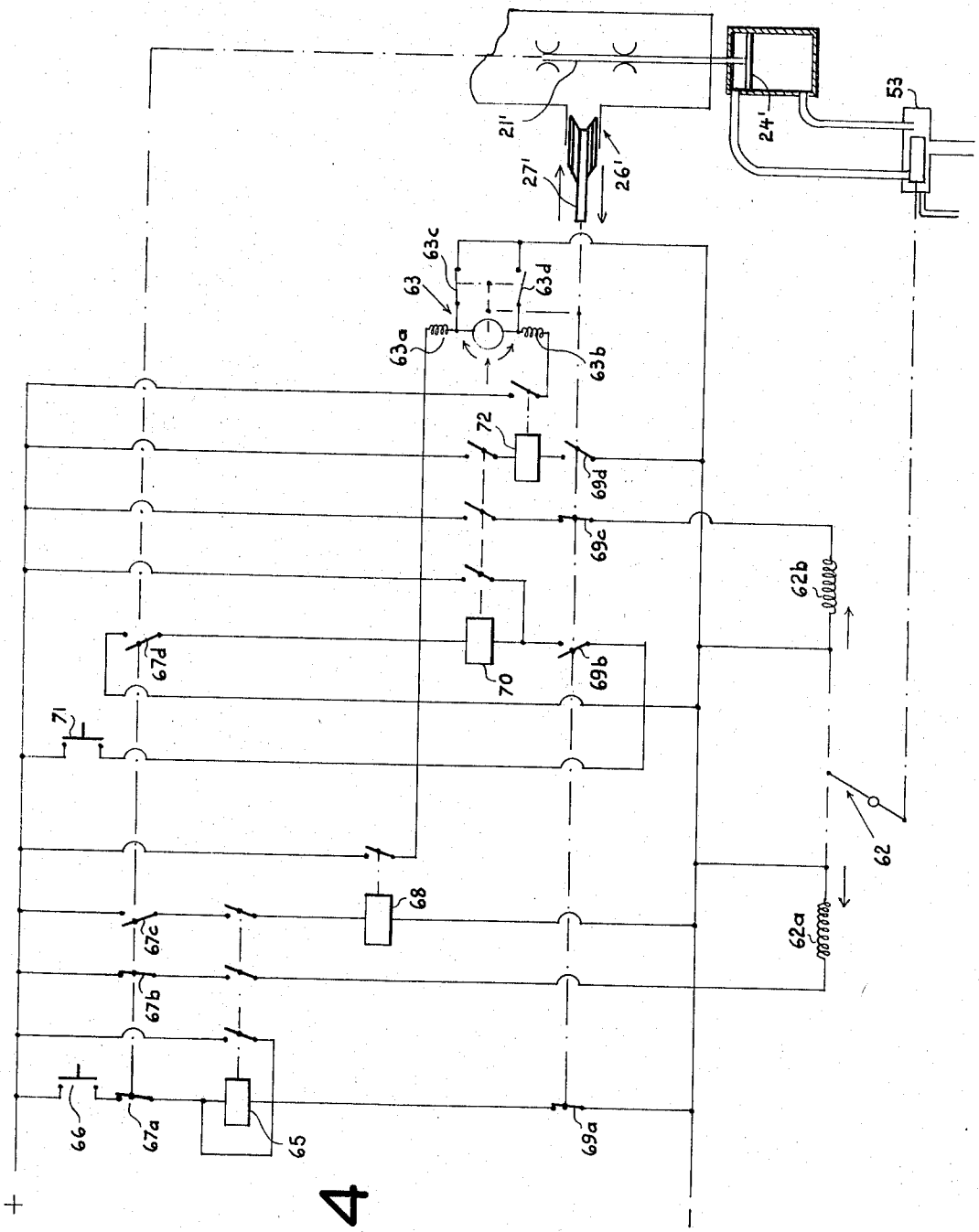
FIG. 4 is a circuit diagram representing an alternate interlocking control system.

In FIG. 4 a similar interlocking effect is obtained by an electrical system in which the fluid-control valve 53 for piston 24' and the shutter 27' of gate valve 26' are respectively driven electrically by a solenoid 62 with windings 62a, 62b and by a reversible motor 63 with windings 63a, 63b. A self-locking relay 65 is operable by a pushbutton 66 to energize solenoid coil 62a for a reversal of valve 53; the operating circuit of relay 65 includes a contact 67a controlled by switch armature 21' together with further contacts 67b, 67c and 67d. When the armature 21' is withdrawn upon such reversal of valve 53, contact 67a in series with pushbutton 66 and contact 67b in series with solenoid winding 62a are opened whereas contact 67c in series with a make contact of relay 65 is closed to actuate a relay 68 which in turn energizes the motor winding 63a to move the shutter 27' into its closed position; shutter 27' controls a set of contacts 69a, 69b, 69c and 69d, the first one of these breaking the holding circuit of relay 65 which thereupon releases and also causes the de-energization of relay 68. Contacts 69b and 67d, both closed, prepare an energizing circuit for a relay 70 but nothing happens until a pushbutton 71 is depressed to complete that circuit. Relay 70, which is self-locking like relay 65, then attracts one of its contacts in series with shutter-controlled contact 69d, now closed, to actuate a relay 72 for the energization of motor winding 63b whereby shutter 27' is again withdrawn, thus reversing the contacts 69a–69d; it should be noted that this shutter also controls a pair of limit switches 63c, 63d which arrest the motor 63 at the end of the inward and outward shutter stroke, respectively. With relay 70 locked over the still closed piston-controlled contact 67d, reclosure of contact 69c completes an operating circuit for solenoid coil 62b which shifts the valve 53 into its alternate position so that piston 24' rises and restores the original condition illustrated in FIG. 4. The cycle can then be repeated by another actuation of pushbutton 66. Thus, the system just described automatically insures that the armature 21' and the shutter 27' are operated in the proper sequence.

The systems of FIGS. 3 and 4 will, of course, be duplicated for all the branches of container 10. It will also be apparent that certain parts, e.g. the obstructors 49, 60 of FIG. 3 or the core of solenoid 62 in FIG. 4 may visually indicate the position of the shutter and switch but that, if desired, special signal lamps or the like (not shown) may be provided for this purpose.

I claim:
1. A switching assembly comprising a metal container with a plurality of communicating branches, means for introducing an insulating fluid into said container, conductor means in said container forming an electrical circuit including a plurality of switches each located within a respective branch, each of said switches including two spaced-apart contacts and a connecting armature, said armature being movable from an operative position interconnecting said contacts to an inoperative position separated from at least one of said contacts, and gate-valve means in each of said branches having a shutter element interposable between the two contacts of the associated switch upon movement of said armature to said inoperative position, said sealing element in its interposed position blocking any movement of said armature into said opeartive position.

2. An assembly as defined in claim 1 wherein said shutter element is electrically conductive and is grounded through the walls of the respective branch.

3. An assembly as defined in claim 1 wherein the gate-valve means and the switch of each of said branches are provided with respective actuating members and interlocking control means enabling operation of each of said members only in a withdrawn position of the respective other member.

4. An assembly as defined in claim 1 wherein each of said branches is provided with a peripheral recess located between the two contacts of the associated switch, said shutter element including two generally parallel plates movable toward and away from each other and spreader means attached thereto for separating same upon insertion of said plates into said recess.

5. An assembly as defined in claim 1 wherein said gate-valve means comprises an actuating member projecting outwardly from said container for visually indicating the position of said shutter element.

6. An assembly as defined in claim 1 wherein said container has a main compartment communicating with said branches, further comprising a circuit breaker in said main compartment connected by conductors inside said container between a high-voltage terminal and one of the contacts of each of said switches.

References Cited by the Examiner
UNITED STATES PATENTS

| | | | |
|---|---|---|---|
| 1,955,216 | 4/1934 | Whitney et al. | 200—150 |
| 2,888,540 | 5/1959 | Gratzmuller | 200—151 |

FOREIGN PATENTS

| | | |
|---|---|---|
| 854,584 | 1/1940 | France. |
| 926,514 | 4/1947 | France. |
| 2,080 | 1904 | Great Britain. |
| 16,443 | 1903 | Great Britain. |

ROBERT K. SCHAEFER, *Primary Examiner.*

R. S. MACON, *Assistant Examiner.*